US009305228B1

(12) United States Patent
Williams

(10) Patent No.: US 9,305,228 B1
(45) Date of Patent: Apr. 5, 2016

(54) PROCESSING DAMAGED ITEMS USING IMAGE DATA LIFT

(71) Applicant: Bank of America Corporation, Charlotte, NC (US)

(72) Inventor: Geoffrey R. Williams, Midlothian, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/663,535

(22) Filed: Mar. 20, 2015

(51) Int. Cl.
*G06K 9/18* (2006.01)
*G06K 9/03* (2006.01)
*G06Q 20/04* (2012.01)
*G07F 19/00* (2006.01)
*G06K 17/00* (2006.01)

(52) U.S. Cl.
CPC .............. *G06K 9/186* (2013.01); *G06Q 20/042* (2013.01); *G07F 19/202* (2013.01); *G06K 2017/0038* (2013.01)

(58) Field of Classification Search
CPC ............... G06Q 20/042; G06K 9/186; G06K 2017/0038; G06K 9/03; G06K 9/00442; G06K 19/06187; G06K 7/084; G07F 19/202
USPC ....... 235/379; 194/210; 705/43, 45; 382/139, 382/140
See application file for complete search history.

(56) References Cited

U.S. PATENT DOCUMENTS

| 8,150,164 | B2 | 4/2012 | Oh et al. |
| 8,234,277 | B2 | 7/2012 | Thong et al. |
| 8,254,697 | B2 | 8/2012 | Isard et al. |
| 8,452,106 | B2 | 5/2013 | Ke et al. |
| 8,705,876 | B2 | 4/2014 | Vaddadi et al. |
| 8,712,143 | B2 | 4/2014 | Tran |
| 2005/0097046 | A1 | 5/2005 | Singfield |
| 2006/0133277 | A1 | 6/2006 | Carozza et al. |

(Continued)

FOREIGN PATENT DOCUMENTS

WO 2009105708 A2 8/2009

OTHER PUBLICATIONS

"Routing transit number," from Wikipedia, the free encyclopedia, accessed Mar. 10, 2015 from http://en.wikipedia.org/wiki/Routing_transit_number, 14 pages.

(Continued)

*Primary Examiner* — Michael G Lee
*Assistant Examiner* — Suezu Ellis
(74) *Attorney, Agent, or Firm* — Banner & Witcoff, Ltd.; Michael A. Springs

(57) ABSTRACT

Methods, systems, and computer-readable media for processing damaged items using image data lift are presented. In some embodiments, a computing platform may receive image data of a deposit item. Subsequently, the computing platform may determine whether a magnetic ink character recognition (MICR) line of the deposit item is readable. If the MICR line is not readable, the computing platform may perform an image data lift on the image data to extract information from one or more visible fields of the deposit item. Then, the computing platform may identify a payor of the deposit item based on the extracted information and may determine whether the deposit item is an on-us item. If the deposit item is an on-us item, the computing platform may rebuild MICR information for the deposit item. Thereafter, the computing platform may process the deposit item for deposit based on the rebuilt MICR information.

18 Claims, 14 Drawing Sheets

(56) References Cited

U.S. PATENT DOCUMENTS

| | | |
|---|---|---|
| 2009/0242623 A1 | 10/2009 | Bonds et al. |
| 2009/0263004 A1 | 10/2009 | Hawkins et al. |
| 2009/0307136 A1 | 12/2009 | Hawkins |
| 2009/0310188 A1 | 12/2009 | Jones et al. |
| 2009/0313159 A1 | 12/2009 | Jones et al. |
| 2009/0319424 A1 | 12/2009 | Calman et al. |
| 2010/0034454 A1 | 2/2010 | Jones et al. |
| 2010/0098318 A1 | 4/2010 | Anderson |
| 2010/0116619 A1 | 5/2010 | Jones |
| 2010/0262522 A1 | 10/2010 | Anderson et al. |
| 2010/0268690 A1 | 10/2010 | Anderson et al. |
| 2011/0087598 A1 | 4/2011 | Bozeman |
| 2011/0112967 A1 | 5/2011 | Anderson et al. |
| 2011/0206266 A1 | 8/2011 | Faulkner et al. |
| 2011/0206267 A1 | 8/2011 | Jones et al. |
| 2011/0215034 A1 | 9/2011 | Mennie et al. |
| 2011/0258113 A1 | 10/2011 | Jones et al. |
| 2011/0320358 A1 | 12/2011 | Harris et al. |
| 2012/0101947 A1 | 4/2012 | Hawkins |
| 2012/0104093 A1 | 5/2012 | Ma et al. |
| 2012/0113489 A1 | 5/2012 | Heit et al. |
| 2012/0136782 A1 | 5/2012 | Norman et al. |
| 2012/0150745 A1 | 6/2012 | Csulits et al. |
| 2012/0166342 A1 | 6/2012 | Reid et al. |
| 2012/0189186 A1 | 7/2012 | Csulits et al. |
| 2012/0314931 A1 | 12/2012 | Bonds et al. |
| 2012/0321170 A2 | 12/2012 | Jones et al. |
| 2013/0034292 A1 | 2/2013 | Hawkins et al. |
| 2013/0054461 A1 | 2/2013 | Gupta et al. |
| 2013/0062405 A1 | 3/2013 | Ma et al. |
| 2013/0101200 A1 | 4/2013 | Faulkner et al. |
| 2013/0112748 A1 | 5/2013 | McGlamery et al. |
| 2013/0117183 A1 | 5/2013 | Bozeman |
| 2013/0124419 A1 | 5/2013 | Riehl et al. |
| 2013/0148874 A1 | 6/2013 | Jones et al. |
| 2013/0156289 A1 | 6/2013 | Hawkins |
| 2013/0156290 A1 | 6/2013 | O'Neill et al. |
| 2013/0156291 A1 | 6/2013 | O'Neill |
| 2013/0193205 A1 | 8/2013 | Jones |
| 2013/0198071 A1 | 8/2013 | Jurss |
| 2013/0213864 A1 | 8/2013 | Mennie et al. |
| 2013/0315467 A1 | 11/2013 | Hawkins |
| 2013/0327686 A1 | 12/2013 | Mennie et al. |
| 2014/0032385 A1 | 1/2014 | Weinflash et al. |
| 2014/0052697 A1 | 2/2014 | Williams et al. |
| 2014/0074718 A1 | 3/2014 | Hawkins et al. |
| 2014/0122341 A1 | 5/2014 | Hawkins et al. |
| 2014/0185947 A1 | 7/2014 | Guo et al. |
| 2014/0214682 A1 | 7/2014 | Dunn et al. |
| 2014/0233834 A1 | 8/2014 | Smith et al. |
| 2014/0310170 A1 | 10/2014 | Riehl et al. |
| 2015/0046333 A1 | 2/2015 | Abernethy et al. |

OTHER PUBLICATIONS

"Investopedia," On-Us Item Definition, accessed Mar. 10, 2015 from http://www.investopedia.com/terms/o/on-us-item.asp, 2 pages.

"Magnetic ink character recognition," from Wikipedia, the free encyclopedia, accessed Mar. 10, 2015 from http://en.wikipedia.org/wiki/Magnetic_ink_character_recognition, 4 pages.

PROCESSING DAMAGED ITEMS USING IMAGE DATA LIFT

BACKGROUND

Aspects of the disclosure relate to computer hardware and software. In particular, one or more aspects of the disclosure generally relate to computer hardware and software for processing damaged items using image data lift.

Financial institutions may receive many items for deposit, including different types of checks drawn on different types of financial accounts. In some instances, a financial institution may receive an item for deposit that is damaged, and it may be difficult, if not impossible, for the computer systems implemented by a financial institution to process such a damaged deposit item for deposit.

Customers of financial institutions increasingly desire and demand more convenient and effective ways of interacting with the financial institutions with which they may maintain accounts. It may be difficult to provide effective, efficient, and convenient ways of processing deposit items that have been damaged for various reasons, however, and in many instances, a financial institution might have to resort to asking a customer to visit a banking center to receive manual assistance with processing a damaged deposit item, which may be inconvenient for the customer and inefficient for the financial institution.

SUMMARY

Aspects of the disclosure relate to various systems and techniques that provide effective, efficient, scalable, and convenient ways of processing damaged deposit items.

For example, some aspects of the disclosure provide ways of processing damaged deposit items, such as ripped items, torn items, stained items, water-damaged items, mangled items, or otherwise-damaged checks, in an automated manner without requiring a customer (who may, e.g., be attempting to deposit a particular damaged deposit item) to visit a banking center to receive manual assistance. In particular, in instances in which a magnetic ink character recognition (MICR) line on a check or other deposit item is damaged or otherwise unreadable by a computer system, for instance, image data lift may be used to extract other information from the face of the check or deposit item that is readable, such as the payor name, payor address, item serial number, and/or the like.

Subsequently, the information extracted from the damaged deposit item may be checked against a master account table to determine if the payor of the deposit item is also an accountholder with the financial institution which has received the deposit item for deposit. If the payor of the deposit item is an accountholder with the financial institution, a computer system processing the deposit item may be able to rebuild the MICR information for the deposit item, since the deposit item may be considered an "on-us" item (e.g., because it is drawn on the same financial institution that is processing the deposit, rather than being drawn on a different financial institution), and as a result the financial institution may have records of the routing number(s) and account number(s) for the payor, which can be used by the computer system to determine the MICR information for the deposit item.

Once the MICR information is rebuilt, the computer system can process the deposit item for deposit in an automated fashion. In addition, and as illustrated in greater detail below, certain processing rules may be applied in some instances to determine whether (and how much) provisional credit should be applied for damaged deposit items processed in this manner using image data lift. Furthermore, once the MICR line information for the damaged deposit item is rebuilt, the deposit item may be added to an item history database that can be used to check for duplicate deposits. Additionally or alternatively, duplicate detection may be performed by the computer system to check the damaged deposit item against the item history database to determine if the deposit item is a duplicate of a previously deposited item. In some instances, item-level verification of deposit items also may be performed by the computer system on individual deposit items in determining and/or assigning funds availability holds (e.g., to particular deposit items, if necessary based on one or more regulatory guidelines). As illustrated in greater detail below, these features and/or others may provide more effective, efficient, scalable, and convenient ways for customers of a financial institution to deposit checks or other deposit items that may be damaged in some way.

In accordance with one or more embodiments, an item processing computing platform having at least one processor, a memory, and a communication interface may receive, via the communication interface, and from a computing device, image data of a deposit item captured by the computing device. Subsequently, the item processing computing platform may determine whether a magnetic ink character recognition (MICR) line of the deposit item is readable based on the image data of the deposit item captured by the computing device. If the MICR line of the deposit item is readable, the item processing computing platform may process the deposit item for deposit based on the MICR line of the deposit item. If the MICR line of the deposit item is not readable, the item processing computing platform may perform an image data lift on the image data of the deposit item to extract information from one or more visible fields of the deposit item. Next, the item processing computing platform may identify a payor of the deposit item based on the information extracted from the one or more visible fields of the deposit item. Subsequently, the item processing computing platform may determine, based on the payor of the deposit item, whether the deposit item is an on-us item. If the deposit item is not an on-us item, the item processing computing platform may reject the deposit item. If the deposit item is an on-us item, the item processing computing platform may rebuild MICR information for the deposit item based on the payor of the deposit item identified based on the information extracted from the one or more visible fields of the deposit item. Thereafter, the item processing computing platform may process the deposit item for deposit based on the MICR information for the deposit item rebuilt based on the payor of the deposit item identified based on the information extracted from the one or more visible fields of the deposit item.

In some embodiments, the computing device may be an automated teller machine (ATM) operated by a financial institution operating the system. In other embodiments, the computing device may be a mobile computing device that includes a mobile banking application configured to be used by a customer of a financial institution operating the system. In still other embodiments, the computing device may be a teller terminal device configured to be used by a bank teller in a banking center of a financial institution operating the system.

In some embodiments, identifying the payor of the deposit item based on the information extracted from the one or more visible fields of the deposit item may include identifying the payor of the deposit item based on one or more of payor name information or payor address information extracted from the one or more visible fields of the deposit item during the image data lift.

In some embodiments, the deposit item is an on-us item if the deposit item is drawn on a financial institution operating the system.

In some embodiments, rebuilding the MICR information for the deposit item based on the payor of the deposit item may include: identifying a routing number associated with a financial account of the payor of the deposit item; identifying an account number associated with the financial account of the payor of the deposit item; and compiling the routing number associated with the financial account of the payor of the deposit item and the account number associated with the financial account of the payor of the deposit item to create the MICR information for the deposit item.

In some embodiments, the item processing computing platform may perform duplicate detection on the deposit item based on item history information obtained from an item history database.

In some embodiments, the item processing computing platform may add item history information to an item history database based on the MICR information for the deposit item rebuilt based on the payor of the deposit item identified based on the information extracted from the one or more visible fields of the deposit item.

In some embodiments, processing the deposit item for deposit based on the MICR information may include applying one or more provisional credit rules to determine whether provisional credit is applied to a deposit account for the deposit item based on a number of visible fields from which information is extracted during the image data lift.

In some embodiments, after processing the deposit item for deposit based on the MICR information, the item processing computing platform may cause a notification to be presented on the computing device indicating that the deposit item has been processed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
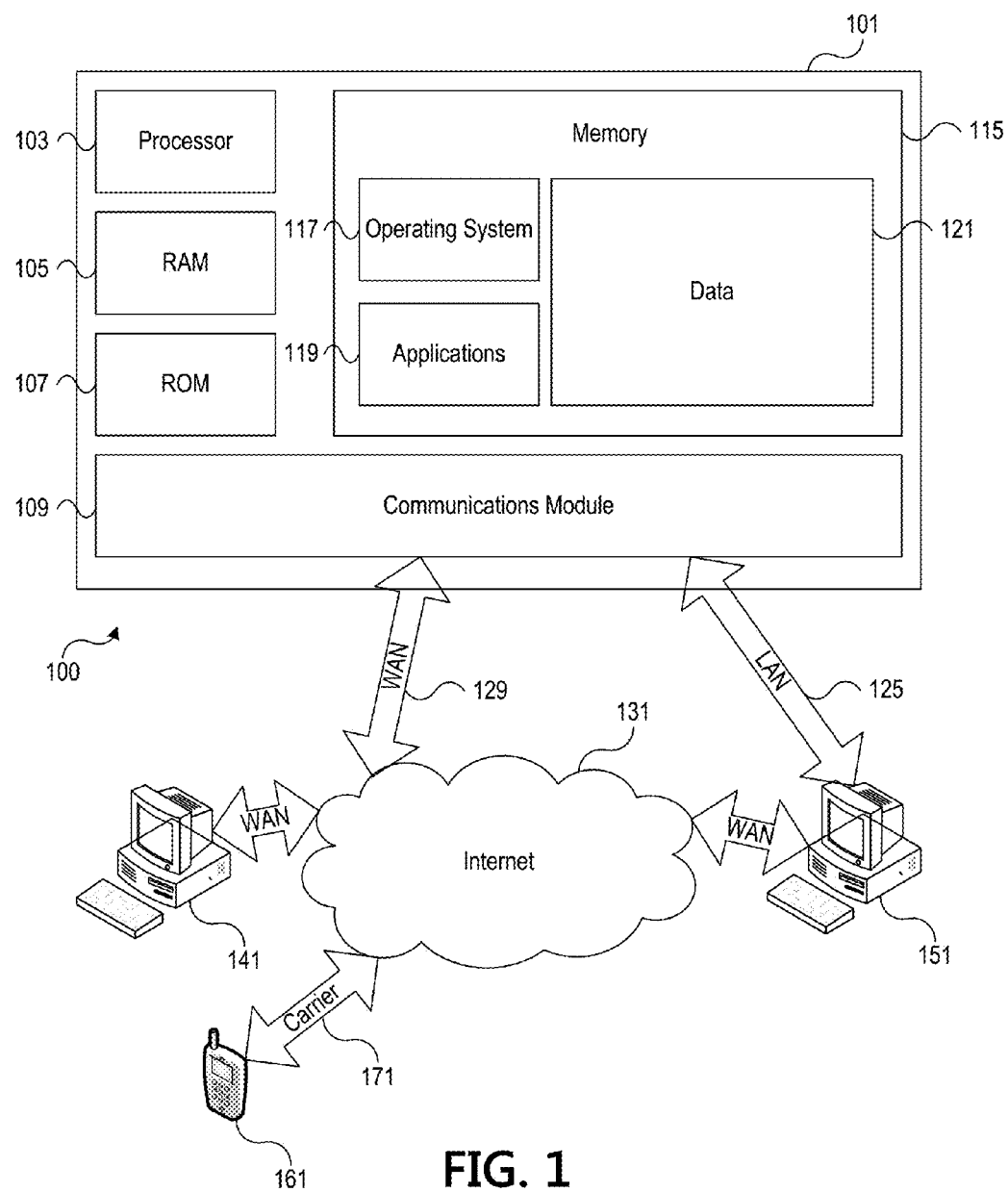
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
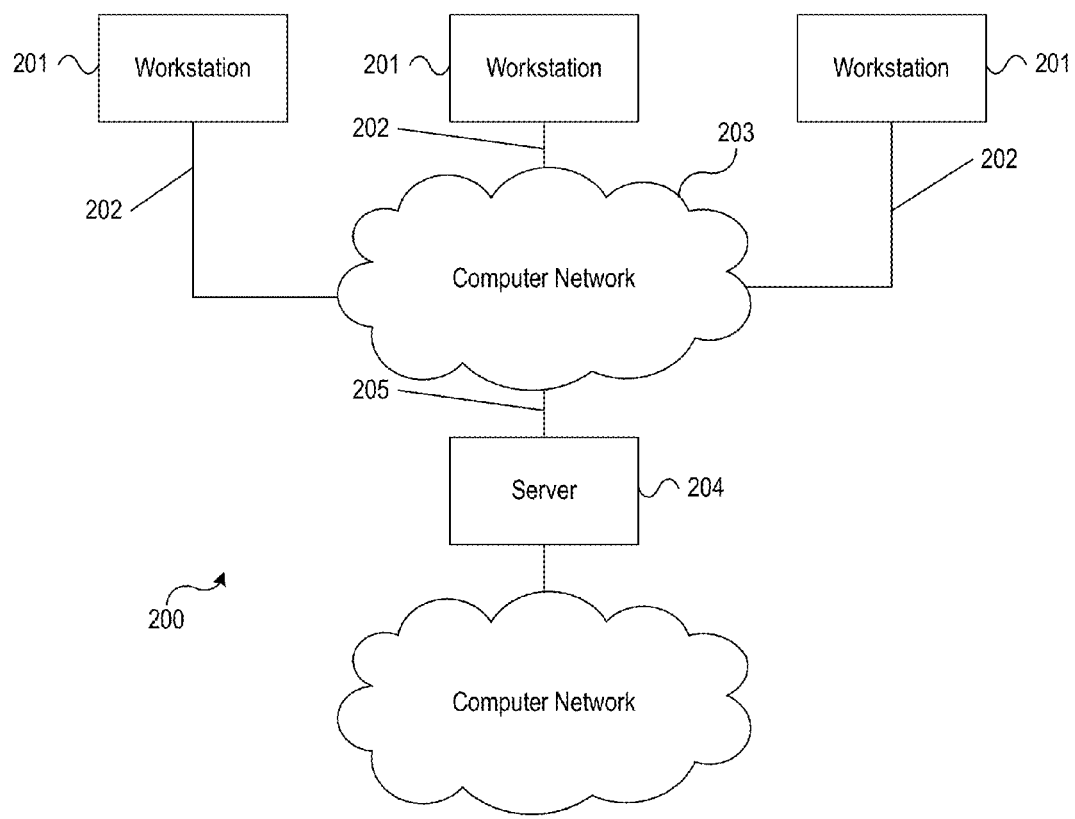
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
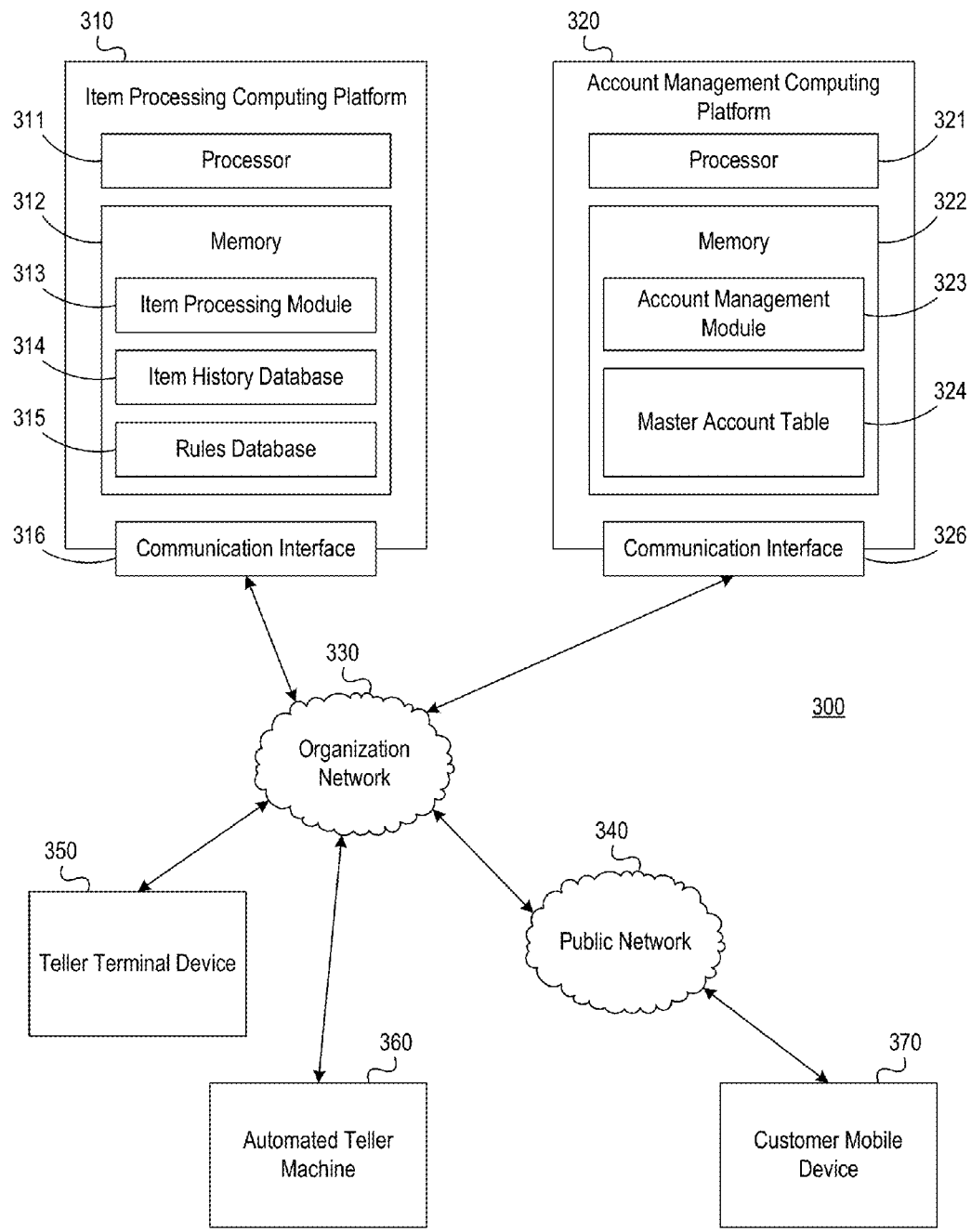
FIG. 3 depicts an illustrative computing environment for processing damaged items using image data lift in accordance with one or more example embodiments.

FIG. 3 depicts an illustrative computing environment for processing damaged items using image data lift in accordance with one or more example embodiments. Referring to FIG. 3, computing environment 300 may include one or more computing devices. For example, computing environment 300 may include a teller terminal device 350, an automated teller machine 360, and a customer mobile device 370. Teller terminal device 350 may, for example, be configured to be used by an employee, associate, or affiliate of an organization that may process deposit items for one or more customers using one or more of the computer systems and/or other elements included in computing environment 300. For example, in some instances, teller terminal device 350 may be configured to be used by a bank teller of a financial institution that may process deposit items for one or more customers using one or more of the computer systems and/or other elements included in computing environment 300, as illustrated in greater detail below. Automated teller machine 360 may, for example, be an automated teller machine that is configured to dispense funds to customers of an organization, accept deposit items from customers, allow customers to view account balances, and/or automatically provide other functionalities to customers. For example, in some instances, automated teller machine 360 may be operated by a financial institution that may process deposit items for one or more customers using one or more of the computer systems and/or other elements included in computing environment 300, as illustrated in greater detail below. Customer mobile device 370 may, for example, be a mobile computing device that is used by a customer of an organization, such as a financial institution. In some instances, customer mobile device 370 may include a mobile banking application and/or other mobile banking software (which may, e.g., enable the user of customer mobile device 370 to electronically present one or more deposit items for deposit with the financial institution), and such a mobile banking application and/or other mobile banking software may, for instance, be provided by a financial institution that may process deposit items for one or more customers using one or more of the computer systems and/or other elements included in computing environment 300, as illustrated in greater detail below.

Teller terminal device 350, automated teller machine 360, and customer mobile device 370 may be any type of computing device capable of receiving a user interface, receiving input via the user interface, and communicating the received input to one or more other computing devices. For example, teller terminal device 350, automated teller machine 360, and customer mobile device 370 may be a server computer, a desktop computer, laptop computer, tablet computer, smart phone, or the like. As noted above, and as illustrated in greater detail below, any and/or all of teller terminal device 350, automated teller machine 360, and customer mobile device 370 may, in some instances, be special-purpose computing devices configured to perform specific functions.

Computing environment 300 also may include one or more computing platforms. For example, computing environment 300 may include item processing computing platform 310 and account management computing platform 320. Item processing computing platform 310 may include one or more computing devices configured to perform one or more of the functions described herein. For example, item processing computing platform 310 may include one or more computers (e.g., laptop computers, desktop computers, servers, server blades, or the like). Similarly, account management computing platform 320 may include one or more computing devices configured to perform one or more of the functions described herein. For example, account management computing platform 320 may include one or more computers (e.g., laptop computers, desktop computers, servers, server blades, or the like).

Computing environment 300 also may include one or more networks, which may interconnect one or more of teller terminal device 350, automated teller machine 360, customer mobile device 370, item processing computing platform 310, and account management computing platform 320. For example, computing environment 300 may include organization network 330 and public network 340. Organization network 330 and/or public network 340 may include one or more sub-networks (e.g., LANs, WANs, or the like). Organization network 330 may be associated with a particular organization (e.g., a corporation, financial institution, educational institution, governmental institution, or the like) and may interconnect one or more computing devices associated with the organization. For example, teller terminal device 350, automated teller machine 360, item processing computing platform 310, and account management computing platform 320 may be associated with an organization (e.g., a financial institution), and organization network 330 may be associated with and/or operated by the organization, and may include one or more networks (e.g., LANs, WANs, VPNs, or the like) that interconnect teller terminal device 350, automated teller machine 360, item processing computing platform 310, and account management computing platform 320 and one or more other computing devices and/or computer systems that are used by, operated by, and/or otherwise associated with the organization. Public network 340 may connect organization network 330 and/or one or more computing devices connected thereto (e.g., teller terminal device 350, automated teller machine 360, item processing computing platform 310, and account management computing platform 320) with one or more networks and/or computing devices that are not associated with the organization. For example, customer mobile device 370 might not be associated with an organization that operates organization network 330 (e.g., because customer mobile device 370 may be owned and/or operated by a customer of the organization that operates organization network 330, rather than being owned and/or operated by the organization itself or an employee or affiliate of the organization), and public network 340 may include one or more networks (e.g., the internet) that connect customer mobile device 370 to organization network 330 and/or one or more computing devices connected thereto (e.g., teller terminal device 350, automated teller machine 360, item processing computing platform 310, and account management computing platform 320).

Item processing computing platform 310 may include one or more processor(s) 311, memory 312, and communication interface 316. A data bus may interconnect processor(s) 311, memory 312, and/or communication interface 316. Communication interface 316 may be a network interface configured to support communication between item processing computing platform 310 and organization network 330 and/or one or more sub-networks thereof. Memory 312 may include one or more program modules having instructions that when executed by processor(s) 311 cause item processing computing platform 310 to perform one or more functions described herein and/or one or more databases that may store and/or otherwise maintain information which may be used by such program modules and/or processor(s) 311. For example, memory 312 may include item processing module 313, which may include instructions that when executed by processor(s) 311 cause item processing computing platform 310 to perform one or more functions described herein, such as instructions for processing damaged items using image data lift, as illustrated in greater detail below. Additionally or alternatively, item processing module 313 may include instructions that when executed by processor(s) 311 cause item processing computing platform 310 to provide a downstream item data perfection engine (which may, e.g., be used by a financial institution operating item processing computing platform 310 to perfect data associated with various deposit items). In addition, memory 312 may include an item history database 314 and a rules database 315. Item history database 314 may store and/or maintain information about one or more deposit items that have been previously deposited using and/or otherwise processed by item processing computing platform 310 and/or an organization (e.g., a financial institution) operating item processing computing platform 310. Rules database 315 may store and/or maintain information defining one or more processing rules that may be used by item processing computing platform 310 in processing one or more deposit items, such as one or more processing rules defining circumstances in which provisional credit may be applied to a financial account when processing a particular deposit item for deposit.

Account management computing platform 320 may include one or more processor(s) 321, memory 322, and communication interface 326. A data bus may interconnect processor(s) 321, memory 322, and/or communication interface 326. Communication interface 326 may be a network interface configured to support communication between account management computing platform 320 and organization network 330 and/or one or more sub-networks thereof. Memory 322 may include one or more program modules having instructions that when executed by processor(s) 321 cause account management computing platform 320 to perform one or more functions described herein and/or one or more data tables that may store and/or otherwise maintain information which may be used by such program modules and/or processor(s) 321. For example, memory 322 may include account management module 323, which may include instructions that when executed by processor(s) 321 cause account management computing platform 320 to perform one or more functions described herein, such as instructions for causing one or more transactions to be performed on one or more financial accounts and/or otherwise executed with respect to one or more financial accounts for which account management computing platform 320 may maintain account information, including account balance information, as illustrated in greater detail below. In addition, memory 322 may include master account table 324. Master account table 324 may store and/or maintain information about one or more financial accounts (e.g., one or more account numbers, one or more account balances, accountholder information, such as name and/or address information, and/or the like) that may be maintained by an organization (e.g., a financial institution) operating account management computing platform 320, and such financial accounts may be maintained by the organization for one or more customers of the organization.

Figure 4A:
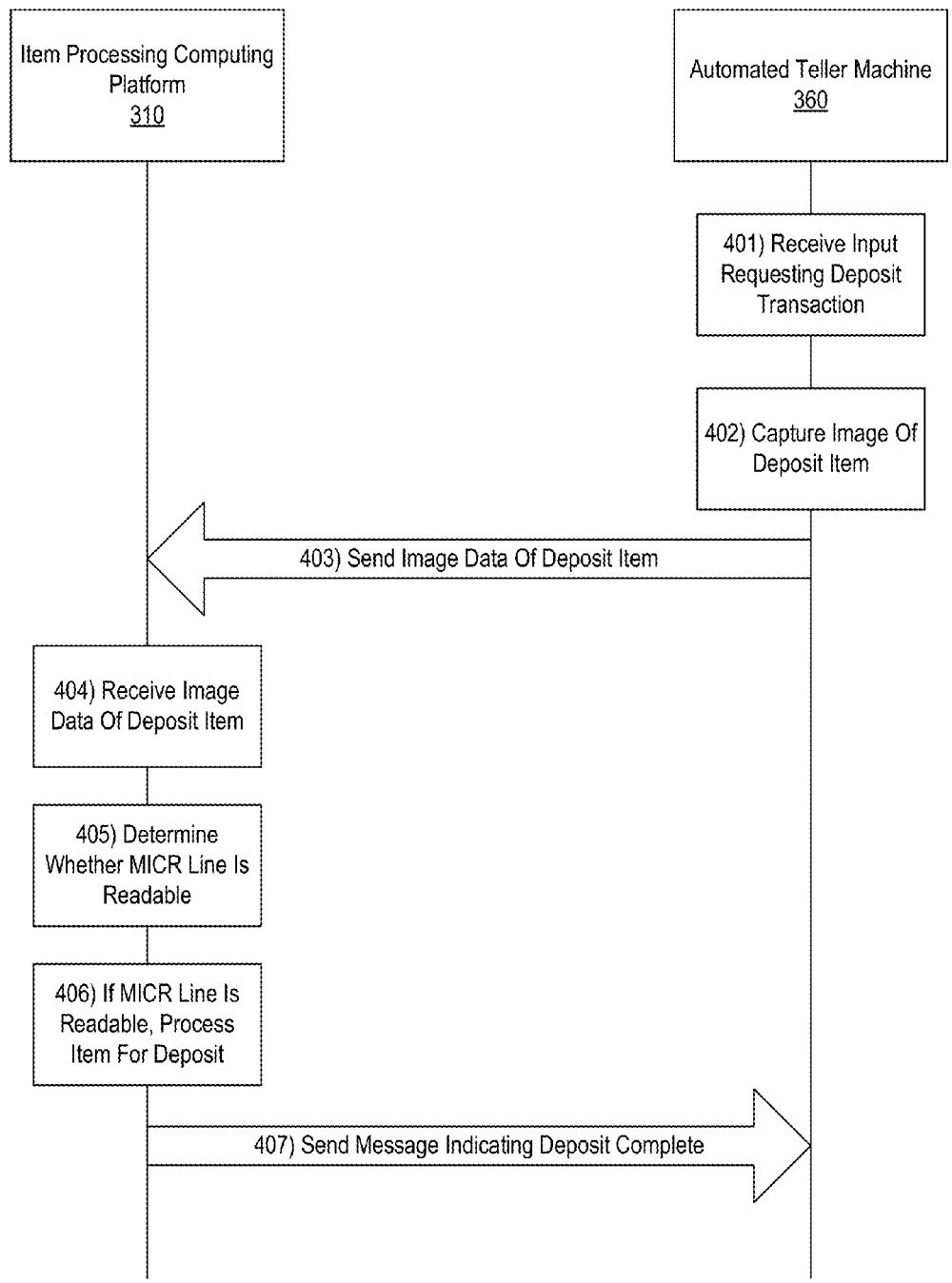
FIGS. 4A-4D depict an illustrative event sequence for processing damaged items using image data lift in accordance with one or more example embodiments.

FIGS. 4A-4D depict an illustrative event sequence for processing damaged items using image data lift in accordance with one or more example embodiments. Referring to FIG. 4A, at step 401, automated teller machine 360 may receive input requesting to perform a deposit transaction. For example, at step 401, automated teller machine 360 may receive input from a user of automated teller machine 360 (who may, e.g., be a customer of a financial institution operating automated teller machine 360) via one or more graphical user interfaces presented by automated teller machine 360 (e.g., on a display screen of automated teller machine 360), and such input may command and/or otherwise request automated teller machine 360 to receive a deposit item for deposit and/or otherwise perform a deposit transaction. In some instances, automated teller machine 360 may receive such input after authenticating the user of automated teller machine 360 (e.g., based on a debit card or credit card presented by the user of automated teller machine 360, based on a PIN number entered by the user of automated teller machine 360, based on a one-time passcode entered by the user of automated teller machine 360, and/or based on one or more other credentials provided by the user of automated teller machine 360).

At step 402, automated teller machine 360 may capture an image of a deposit item. For example, at step 402, automated teller machine 360 may capture an image of a deposit item presented for deposit by the user of automated teller machine 360. Automated teller machine 360 may, for instance, capture the image of the deposit item using one or more cameras, scanners, and/or the like that may be included in and/or coupled to automated teller machine 360, which may produce and/or provide image data of the deposit item to one or more processors and/or memory units included in automated teller machine 360. At step 403, automated teller machine 360 may send image data of the deposit item to item processing computing platform 310. For example, at step 403, automated teller machine 360 may send to item processing computing platform 310 the image data of the deposit item captured by automated teller machine 360 at step 402, so as to facilitate processing of the deposit item for deposit (e.g., by the financial institution that may operate automated teller machine 360 and/or item processing computing platform 310), as illustrated in greater detail below.

At step 404, item processing computing platform 310 may receive the image data of the deposit item from automated teller machine 360. For example, at step 404, item processing computing platform 310 may receive, via a communication interface (e.g., communication interface 316), and from a computing device (e.g., automated teller machine 360), image data of a deposit item captured by the computing device (e.g., automated teller machine 360). In some embodiments, the computing device (e.g., from which item processing computing platform 310 may receive the image data) may be an automated teller machine (ATM) operated by a financial institution operating the system (e.g., item processing computing platform 310). For instance, item processing computing platform 310 may receive the image data from automated teller machine 360, as illustrated in FIG. 4A. In other embodiments, the computing device (e.g., from which item processing computing platform 310 may receive the image data) may be a mobile computing device that has a mobile banking application configured to be used by a customer of a financial institution operating the system (e.g., item processing computing platform 310). For instance, item processing computing platform 310 may receive the image data from customer mobile device 370, as discussed in greater detail below. In still other embodiments, the computing device (e.g., from which item processing computing platform 310 may receive the image data) may be a teller terminal device configured to be used by a bank teller in a banking center of a financial institution operating the system (e.g., item processing computing platform 310). For instance, item processing computing platform 310 may receive the image data from teller terminal device 350, and similar steps may be performed by item processing computing platform 310 in processing the image data and/or the deposit item corresponding to the image data (e.g., in instances in which a customer of a financial institution brings a damaged item to a banking center for deposit and a teller at the banking center uses teller terminal device 350 to assist the customer depositing the deposit item corresponding to the image data). In yet other embodiments, the computing device (e.g., from which item processing computing platform 310 may receive the image data) may be a point-of-capture device, which may be any type of computing device capable of capturing an image of a deposit item and communicating image data to item processing computing platform 310.

At step 405, item processing computing platform 310 may determine whether a MICR line of the deposit item is readable. For example, at step 405, item processing computing platform 310 may determine whether a magnetic ink character recognition (MICR) line of the deposit item is readable based on the image data of the deposit item captured by the computing device (e.g., automated teller machine 360). For example, the deposit item corresponding to the image data (which may, e.g., be received by item processing computing platform 310 at step 404) may be a check or other financial document, and may have a MICR line that includes a routing number, an account number, and/or other information identifying the deposit item and/or a financial account corresponding to the deposit item. In some instances, the MICR line may additionally or alternatively include a serial number of the deposit item, a monetary amount for the deposit item, and/or other information.

Figure 4B:
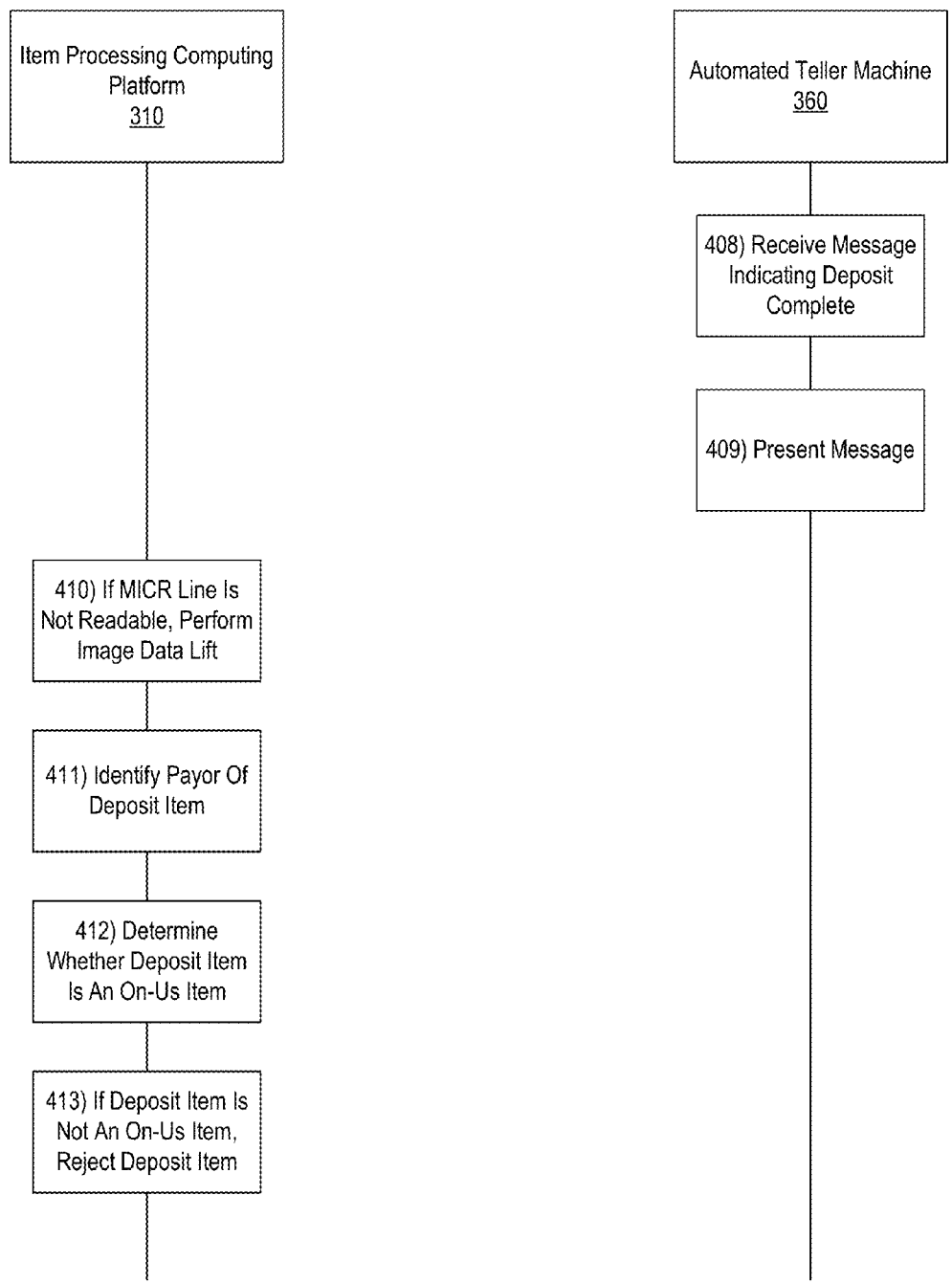

If the MICR line of the deposit item is readable (e.g., at step 405), then at step 406, item processing computing platform 310 may process the item for deposit. For example, if item processing computing platform 310 determines at step 405 that the MICR line of the deposit item is readable (e.g., using one or more optical character recognition techniques and/or other text recognition techniques), then at step 406, item processing computing platform 310 may process the deposit item for deposit based on the MICR line of the deposit item. In processing the deposit item for deposit based on the MICR line of the deposit item, item processing computing platform 310 may, for instance, request and/or cause one or more funds to be withdrawn from the financial account identified in the MICR line of the deposit item and/or may request and/or cause such funds to be deposited into the financial account of the person presenting the deposit item for deposit (e.g., the user of automated teller machine 360). In some instances, item processing computing platform 310 may cause the deposit item to be processed for deposit by sending one or more commands and/or other information, including MICR line information, to account management computing platform 320. For example, account management computing platform 320 and/or account management module 323 of account management computing platform 320 may receive such commands and/or other information and may cause a deposit transaction to be executed based on the deposit item, for instance, by updating one or more account records in master account table 324. After processing the item for deposit (e.g., at step 406), item processing computing platform 310 may, at step 407, send to automated teller machine 360 a message indicating that the deposit is complete. Referring to FIG. 4B, at step 408, automated teller machine 360 may receive the message indicating that the deposit is complete. At step 409, automated teller machine 360 may present the message indicating that the deposit is complete. For example, at step 409, automated teller machine 360 may present one or more graphical user interfaces that include information indicating that the deposit item has been successfully processed.

Alternatively, if the MICR line of the deposit item is not readable (e.g., at step 405), then at step 410, item processing computing platform 310 may perform an image data lift on the image data of the deposit item. For example, if item processing computing platform 310 determines at step 405 that the MICR line of the deposit item is not readable, then at step 410, item processing computing platform 310 may perform an image data lift on the image data of the deposit item to extract information from one or more visible fields of the deposit item. In some instances, the MICR line of the deposit item might be unreadable by item processing computing platform 310 because the portion of the deposit item that includes the MICR line and/or other portions of the deposit item are ripped, torn, stained, and/or otherwise physically damaged. Because item processing computing platform 310 is not able to read the MICR line in such instances, item processing computing platform 310 may perform an image data lift to extract other information from other fields of the deposit item in an attempt to process the deposit item even though the routing number and account number for the deposit item cannot be read from the MICR line, as illustrated in greater detail below. In performing the image data lift on the image data of the deposit item, item processing computing platform 310 may reprocess the image data into text data and/or other non-image data. For example, numbers, letters, and/or the like on the deposit item may be captured in the image data but read and/or stored by item processing computing platform 310 as text data. In processing the image data in this way, item processing computing platform 310 may utilize optical character recognition (OCR) techniques in some instances. In addition, in reprocessing image data into text data, item processing computing platform 310 may, in some instances, reprocess both typewritten information on the face of the deposit item (which may, e.g., include a payor name, payor address, and/or other information printed on the face of the deposit item) and handwritten information on the face of the deposit item (which may, e.g., include a date, memo line content, signature line content, and/or other handwritten information included on the face of the deposit item).

At step 411, item processing computing platform 310 may identify a payor of the deposit item. For example, at step 411, item processing computing platform 310 may identify a payor of the deposit item based on the information extracted from the one or more visible fields of the deposit item. For instance, item processing computing platform 310 may identify the payor of the deposit item based on extracting the name of the payor and/or other information identifying the payor, such as the address of the payor and/or other unique identifying information associated with the payor, from one or more visible fields of the deposit item during the image data lift. In some embodiments, identifying the payor of the deposit item based on the information extracted from the one or more visible fields of the deposit item may include identifying the payor of the deposit item based on one or more of payor name information or payor address information extracted from the one or more visible fields of the deposit item during the image data lift. For example, in identifying the payor of the deposit item based on the information extracted from the one or more visible fields of the deposit item, item processing computing platform 310 may identify the payor of the deposit item based on one or more of payor name information or payor address information extracted from the one or more visible fields of the deposit item during the image data lift. Such payor name information may, for example, include the full name of the payor or partial name information identifying the payor that is extracted from a payor name field of the deposit item during the image data lift. Similarly, such payor address information may, for example, include the full address of the payor or particular payor address information extracted from the one or more visible fields of the deposit item during the image data lift.

At step 412, item processing computing platform 310 may determine whether the deposit item is an on-us item. For example, at step 412, item processing computing platform 310 may determine, based on the payor of the deposit item, whether the deposit item is an on-us item. In some embodiments, the deposit item is an on-us item if the deposit item is drawn on a financial institution operating the system. For example, the deposit item may be considered and/or treated as an on-us item by item processing computing platform 310 if the deposit item is drawn on the financial institution operating item processing computing platform 310. In determining whether the deposit item is an on-us item based on the payor of the deposit item, item processing computing platform 310 may, for example, compare and/or match the payor name and/or other payor information extracted during the image data lift from one or more visible fields of the deposit item, such as the payor address, with one or more records identifying various accountholders of the financial institution operating item processing computing platform 310. Such records may, for instance, be stored and/or maintained by account management computing platform 320, and item processing computing platform 310 may communicate with account management computing platform 320 to determine whether the payor of the deposit item is an accountholder of the financial institution operating item processing computing platform 310. For instance, account management computing platform 320 may maintain and/or store records in master account table 324 associated with various accountholders of the financial institution, including their names, addresses, routing numbers, account numbers, and/or other information. Item processing computing platform 310 may use any and/or all of this information (which item processing computing platform 310 may, e.g., obtain from account management computing platform 320 and/or master account table 324) to look up the payor of the deposit item and/or determine if the payor of the deposit item is an accountholder of the financial institution operating item processing computing platform 310. In some instances, item processing computing platform 310 may, for example, determine that the payor of the deposit item is an accountholder if item processing computing platform 310 is able to identify one or more records and/or accounts for the payor in master account table 324 and/or based on other information obtained from account management computing platform 320. Additionally or alternatively, item processing computing platform 310 may, in other instances, determine that the payor of the deposit item is not an accountholder if item processing computing platform 310 is not able to identify one or more records and/or accounts for the payor in master account table 324 and/or based on other information obtained from account management computing platform 320.

Figure 4C:
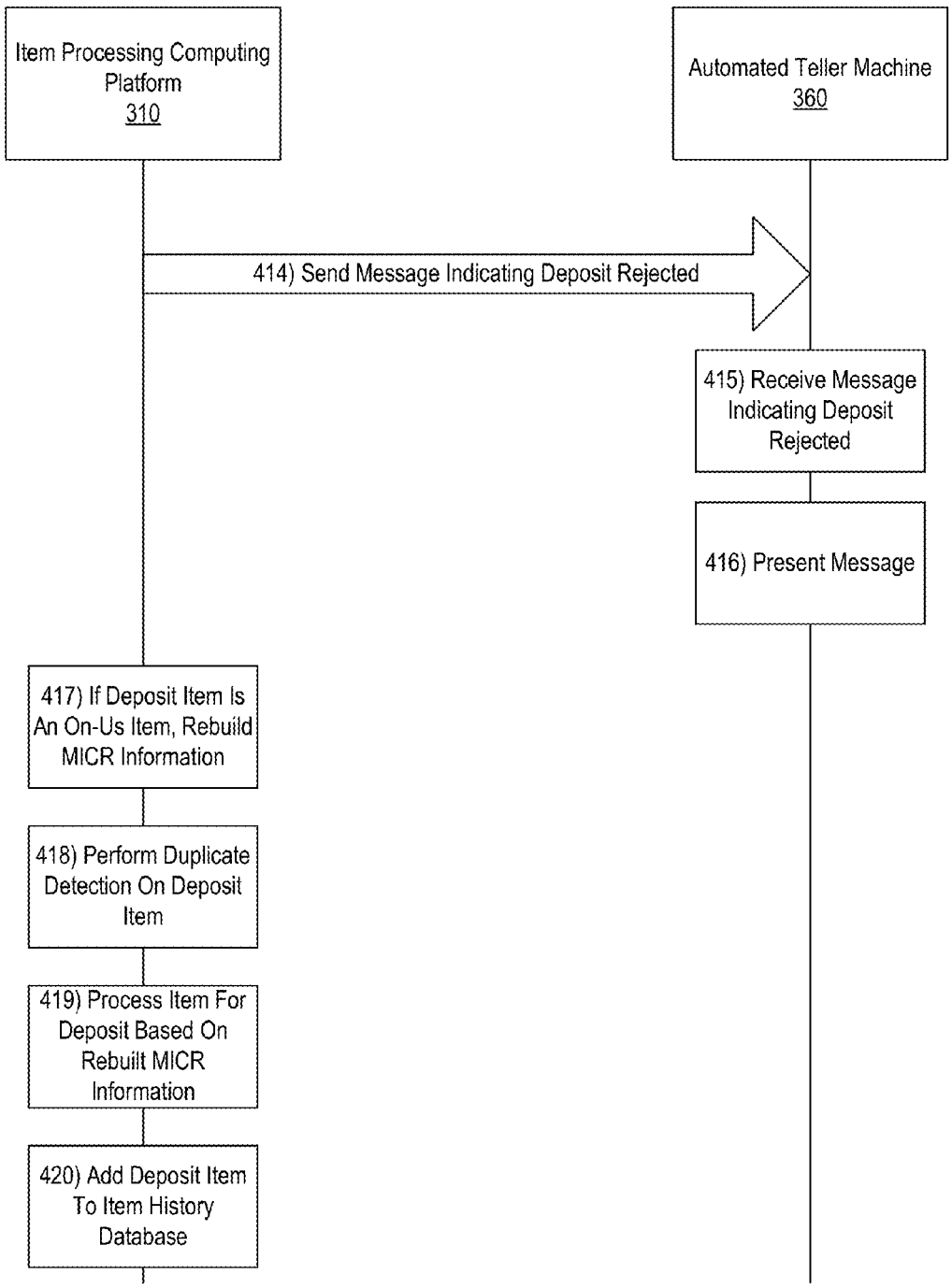
Figure 6:
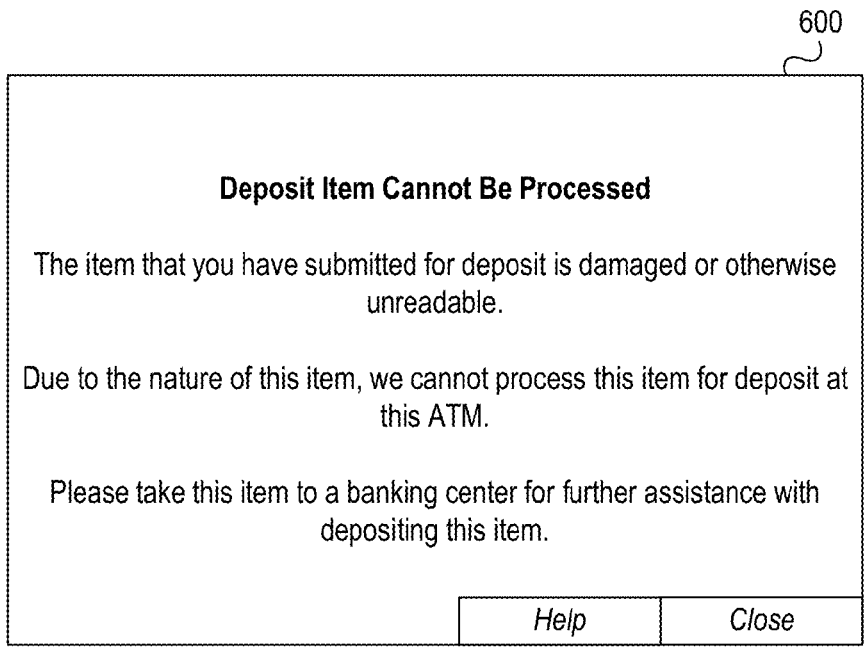
FIGS. 6-9 depict example graphical user interfaces for processing damaged items using image data lift in accordance with one or more example embodiments.

If the deposit item is not an on-us item, then at step 413, item processing computing platform 310 may reject the deposit item For example, if item processing computing platform 310 determines at step 412 that the deposit item is not an on-us item (e.g., based on the payor of the deposit item), then at step 413, item processing computing platform 310 may reject the deposit item. In rejecting the deposit item, item processing computing platform 310 may determine and/or generate one or more notifications indicating that the MICR line for the deposit item cannot be reconstructed because the deposit item is not an on-us item and the payor is not an accountholder with the financial institution operating item processing computing platform 310. For example, a transit item (which may, e.g., be a deposit item that is drawn on a financial institution different from the financial institution to which the deposit item is being presented for deposit) may be rejected if the MICR line of the transit item is unreadable (e.g., because item processing computing platform 310 cannot reconstruct the MICR line information of such a transit item since the payor of the transit item is not an accountholder with the financial institution operating item processing computing platform 310). In some additional or alternative arrangements, prior to rejecting a deposit item that is not an on-us item (e.g., at step 413), item processing computing platform 310 first may attempt to rebuild, based on the image data of the deposit item, the routing transit number of the deposit item (which may, e.g., be considered a transit item since the deposit item may be drawn on an external financial institution different from the financial institution operating item processing computing platform 310, as discussed above). In these additional or alternative arrangements, if item processing computing platform 310 is able to rebuild the routing transit number of the deposit item based on the image data of the deposit item, item processing computing platform 310 then may attempt to re-clear and/or otherwise process the deposit item for deposit (e.g., as item processing computing platform 310 and/or the financial institution operating item processing computing platform 310 may, in some instances, be able to clear a transit item for deposit using only the routing transit number for the deposit item and the amount of the deposit item). Referring to FIG. 4C, at step 414, item processing computing platform 310 may send a message to automated teller machine 360 indicating that the deposit item has been rejected. At step 415, automated teller machine 360 may receive the message indicating that the deposit item has been rejected. At step 416, automated teller machine 360 may present the message indicating that the deposit item has been rejected. For example, in presenting the message indicating that the deposit item has been rejected, automated teller machine 360 may display, cause to be displayed, and/or otherwise present a graphical user interface similar to graphical user interface 600, which is illustrated in FIG. 6. As seen in FIG. 6, graphical user interface 600 may include text and/or information notifying the user of automated teller machine 360 that the deposit item cannot be processed for deposit at automated teller machine 360 and/or requesting that the user of automated teller machine 360 visit a banking center for further assistance with depositing the deposit item.

Alternatively, if the deposit item is an on-us item, then at step 417, item processing computing platform 310 may rebuild MICR information for the deposit item, as illustrated in FIG. 4C. For example, if item processing computing platform 310 determines at step 412 that the deposit item is an on-us item (e.g., based on the payor of the deposit item), then at step 417, item processing computing platform 310 may rebuild MICR information for the deposit item based on the payor of the deposit item (which may, e.g., have been identified by item processing computing platform 310 based on the information extracted by item processing computing platform 310 from the one or more visible fields of the deposit item, as discussed above). In some embodiments, rebuilding the MICR information for the deposit item based on the payor of the deposit item may include: identifying a routing number associated with a financial account of the payor of the deposit item; identifying an account number associated with the financial account of the payor of the deposit item; and compiling the routing number associated with the financial account of the payor of the deposit item and the account number associated with the financial account of the payor of the deposit item to create the MICR information for the deposit item. For example, in rebuilding the MICR information for the deposit item (e.g., at step 417), item processing computing platform 310 may identify a routing number associated with a financial account of the payor of the deposit item (e.g., based on account information for the payor of the deposit item obtained by item processing computing platform 310 from master account table 324 and/or from account management computing platform 320). In addition, item processing computing platform 310 may identify an account number associated with the financial account of the payor of the deposit item (e.g., based on account information for the payor of the deposit item obtained by item processing computing platform 310 from master account table 324 and/or from account management computing platform 320). Subsequently, item processing computing platform 310 may compile the routing number associated with the financial account of the payor of the deposit item and the account number associated with the financial account of the payor of the deposit item to create the MICR information for the deposit item. For example, the rebuilt and/or created MICR information for the deposit item may include or consist of a string of numbers and/or characters that include both the routing number and the account number of a financial account of the payor on which the deposit item is drawn, and item processing computing platform 310 may rebuild and/or create this MICR information by assembling and/or otherwise forming such a string of numbers and/or characters.

At step 418, item processing computing platform 310 may perform duplicate detection on the deposit item. For example, at step 418, item processing computing platform 310 may perform duplicate detection on the deposit item based on item history information obtained from an item history database. In performing duplicate detection on the deposit item, item processing computing platform 310 may, for example, compare MICR information and/or other information associated with the deposit item (e.g., date, amount, memo line content, and/or the like) with item history information identifying characteristics of and/or other information associated with one or more other deposit items that have been previously processed for deposit by the financial institution operating item processing computing platform 310. In addition, such item history information may, in some instances, be stored and/or maintained by item processing computing platform 310 in item history database 314, and item processing computing platform 310 may perform duplicate detection using such information to detect and/or prevent a deposit item from being processed and/or credited more than once and/or otherwise in error.

At step 419, item processing computing platform 310 may process the deposit item for deposit based on the rebuilt MICR information. For example, at step 419, item processing computing platform 310 may process the deposit item for deposit based on the MICR information for the deposit item (which item processing computing platform 310 may have rebuilt based on the payor of the deposit item which item processing computing platform 310 may have identified based on the information extracted from the one or more visible fields of the deposit item, as discussed above). In processing the deposit item for deposit based on the rebuilt MICR information, item processing computing platform 310 may, for instance, request and/or cause one or more funds to be withdrawn from the financial account identified in the rebuilt MICR information and/or may request and/or cause such funds to be deposited into the financial account of the person presenting the deposit item for deposit (e.g., the user of automated teller machine 360). In some instances, item processing computing platform 310 may cause the deposit item to be processed for deposit by sending one or more commands and/or other information, including the rebuilt MICR information, to account management computing platform 320. For example, account management computing platform 320 and/or account management module 323 of account management computing platform 320 may receive such commands and/or other information, including the rebuilt MICR information, and may cause a deposit transaction to be executed based on the rebuilt MICR information for the deposit item, for instance, by updating one or more account records in master account table 324.

In some embodiments, processing the deposit item for deposit based on the MICR information may include applying one or more provisional credit rules to determine whether provisional credit is applied to a deposit account for the deposit item based on a number of visible fields from which information is extracted during the image data lift. For example, in processing the deposit item for deposit based on the rebuilt MICR information, item processing computing platform 310 may apply one or more provisional credit rules to determine whether provisional credit is applied to a deposit account for the deposit item based on a number of visible fields from which information is extracted during the image data lift. For instance, such provisional credit rules may define various different circumstances in which item processing computing platform 310 and/or the financial institution operating item processing computing platform 310 may apply provisional credit to a deposit account (e.g., the financial account into which the deposit item is being deposited) when image data lift is used to rebuild MICR line information for a damaged deposit item so as to facilitate processing of the damaged deposit item for deposit. For example, the provisional credit rules may specify that if both the payor name and the payor address are extracted from visible fields of the deposit item during the image data lift, then a provisional credit in the full amount of the deposit item may be applied to the deposit account (e.g., such that the full amount of the deposit item may be available to satisfy certain types of debits on the deposit account until the deposit item clears and full amount of the deposit item is otherwise available in the deposit account). As another example, the provisional credit rules may specify that if only one of the payor name or the payor address are extracted from visible fields of the deposit item during the image data lift, then a provisional credit less than or equal to a predefined threshold amount (e.g., $100, $500, 10% of the amount of the deposit item, 20% of the amount of the deposit item, or the like) may be applied to the deposit account (e.g., such that only a limited amount of the deposit item, less than or equal to the predefined threshold amount, may be available to satisfy certain types of debits on the deposit account until the deposit item clears and full amount of the deposit item is otherwise available in the deposit account). In one or more arrangements, any and/or all of the provisional credit rules may be stored and/or maintained by item processing computing platform 310 in rules database 315, and item processing computing platform 310 may access and/or load such rules from rules database 315 when processing the deposit item and prior to applying the one or more provisional credit rules. In some instances, in applying the one or more provisional credit rules, item processing computing platform 310 may determine and/or assign a funds availability hold to the deposit item (e.g., based on one or more factors specified by the one or more provisional credit rules, based on one or more regulatory guidelines, and/or the like).

At step 420, item processing computing platform 310 may add the deposit item to an item history database. For example, after processing the item for deposit based on the rebuilt MICR information (e.g., at step 419), item processing computing platform 310 may, at step 420, add item history information to an item history database (e.g., item history database 314) based on the MICR information for the deposit item (which may, e.g., have been rebuilt by item processing computing platform 310 based on the payor of the deposit item, which item processing computing platform 310 may have identified based on the information extracted from the one or more visible fields of the deposit item, as discussed above). By adding item history information for the deposit item to item history database 314, item processing computing platform 310 may prevent the deposit item from being processed for deposit more than once and/or otherwise in error.

Figure 4D:
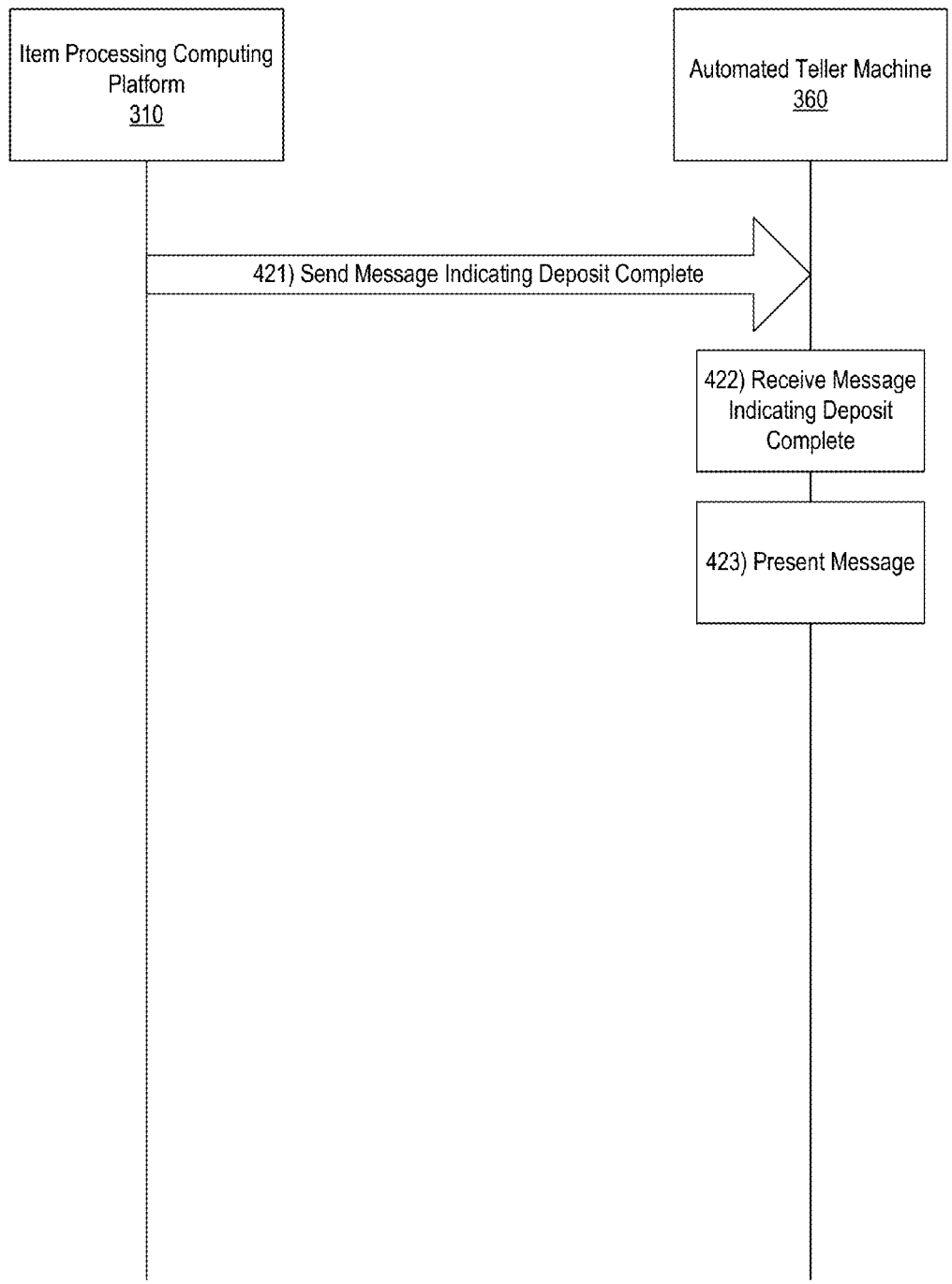

Referring to FIG. 4D, at step 421, item processing computing platform 310 may send a message to automated teller machine 360 indicating that the deposit is complete. For example, after processing the deposit item for deposit based on the MICR information, item processing computing platform 310 may, at step 421, cause a notification to be presented on the computing device (e.g., automated teller machine 360) indicating that the deposit item has been processed by sending a message indicating that the deposit is complete. In some instances, such a message may indicate that the deposit item was processed for deposit using rebuilt MICR information because the original deposit item was mangled and/or otherwise unreadable. Additionally or alternatively, such a message may indicate whether a provisional credit is being applied to the deposit account (e.g., based on the application of the provisional credit rules by item processing computing platform 310 discussed above) and, if so, the amount of such a provisional credit.

Figure 7:
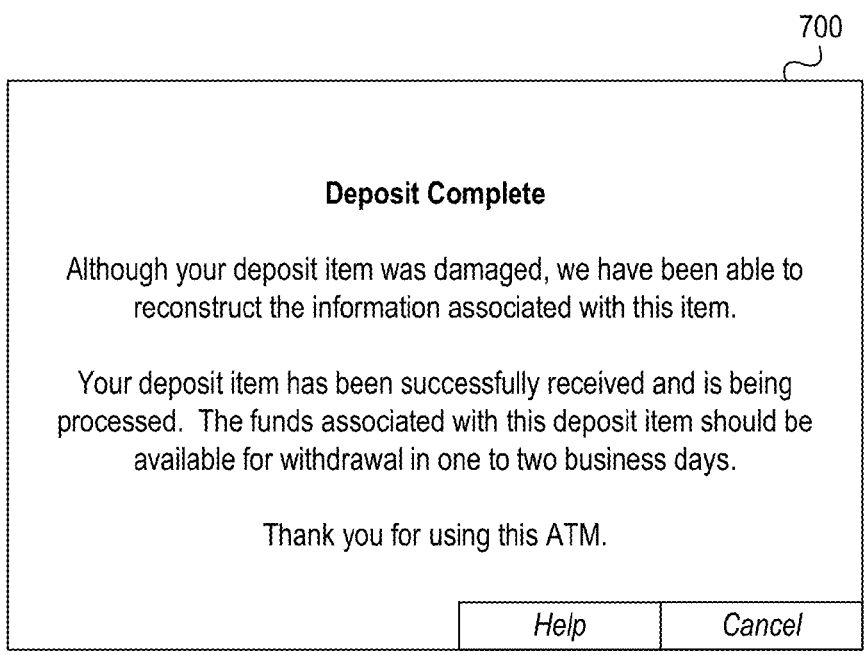

At step 422, automated teller machine 360 may receive the message indicating that the deposit is complete. At step 423, automated teller machine 360 may present the message indicating that the deposit is complete. For example, in presenting the message indicating that the deposit is complete, automated teller machine 360 may display, cause to be displayed, and/or otherwise present a graphical user interface similar to graphical user interface 700, which is illustrated in FIG. 7. As seen in FIG. 7, graphical user interface 700 may include text and/or other information notifying the user of automated teller machine 360 that the deposit item was damaged but deposit information for the deposit item was rebuilt, that the deposit item has been received and is being processed, and/or that funds corresponding to the deposit item will be available in the deposit account at a particular time.

FIGS. 5A-5D depict another illustrative event sequence for processing damaged items using image data lift in accordance with one or more example embodiments. In particular, FIGS. 5A-5D depict an example event sequence illustrating how a deposit item may be processed by item processing computing platform 310 when customer mobile device 370 is used to capture image data of a deposit item and submit the captured image data to item processing computing platform 310 for processing. As illustrated in greater detail below, customer mobile device 370 may perform several steps in this example event sequence similar to those steps performed by automated teller machine 360 in the example event sequence discussed above with respect to FIGS. 4A-4D.

Figure 5A:
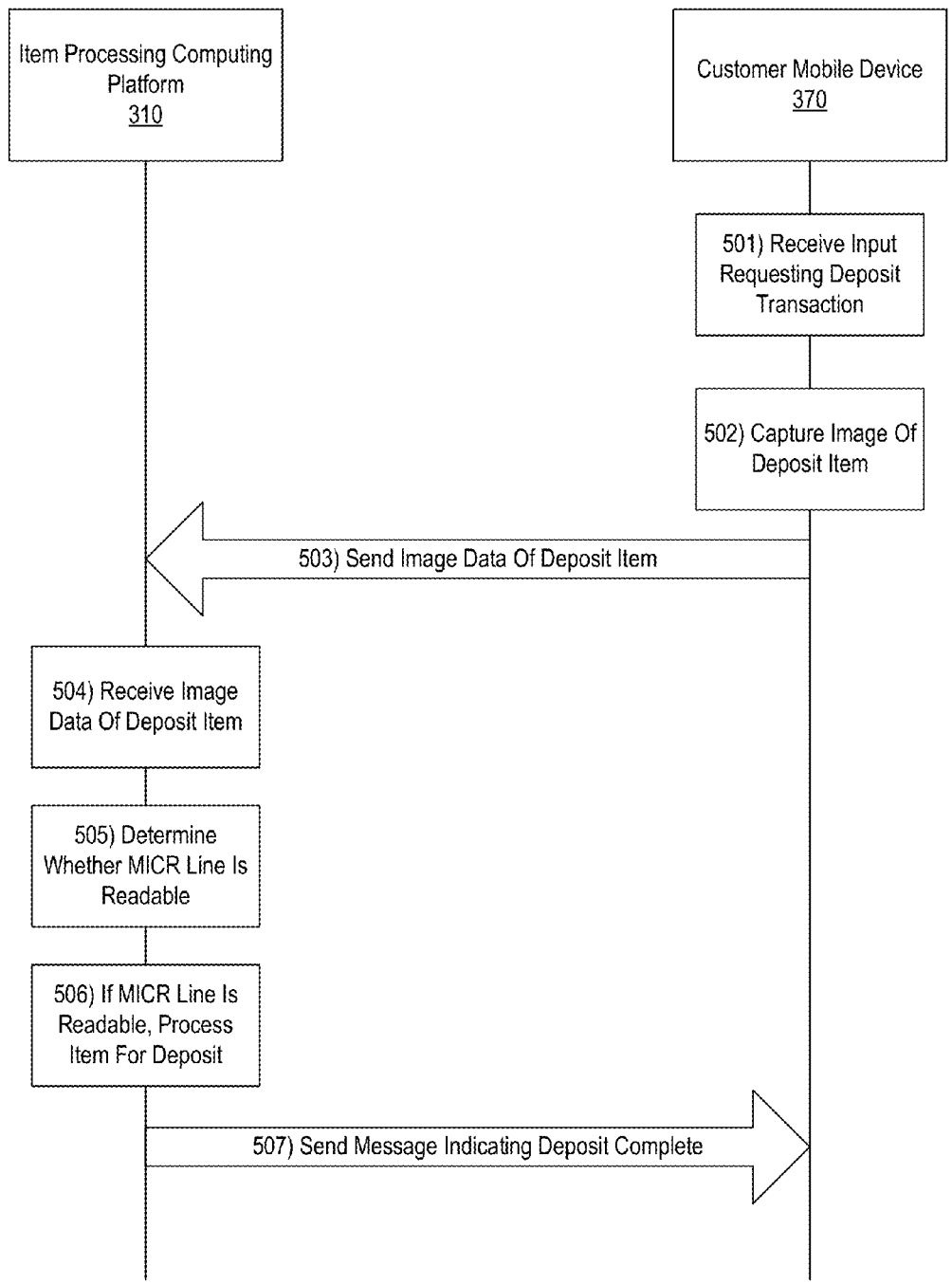
FIGS. 5A-5D depict another illustrative event sequence for processing damaged items using image data lift in accordance with one or more example embodiments.

For example, referring to FIG. 5A, at step 501, customer mobile device 370 may receive input requesting to perform a deposit transaction. In some instances, such input may be received via a mobile banking application on customer mobile device 370 (which may, e.g., present one or more graphical user interfaces on customer mobile device 370 via which such input may be received). At step 502, customer mobile device 370 may capture an image of a deposit item. At step 503, customer mobile device 370 may send image data of the deposit item to item processing computing platform 310.

At step 504, item processing computing platform 310 may receive the image data of the deposit item from customer mobile device 370. At step 505, item processing computing platform 310 may determine whether a MICR line of the deposit item is readable (e.g., similar to how item processing computing platform 310 may determine whether a MICR line of the deposit item is readable at step 405).

Figure 5B:
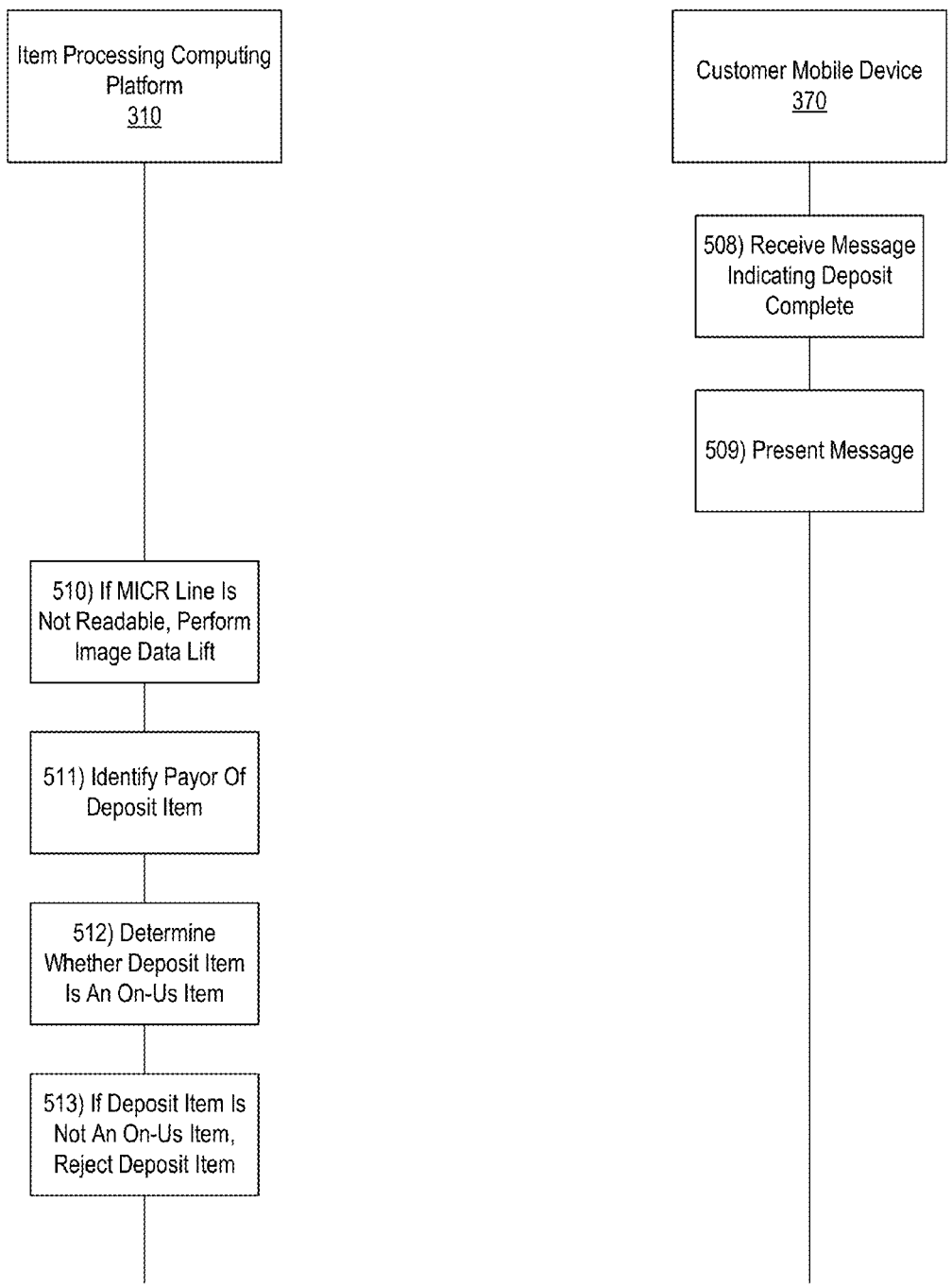

If the MICR line of the deposit item is readable, then at step 506, item processing computing platform 310 may process the deposit item for deposit. At step 507, item processing computing platform 310 may send a message to customer mobile device 370 indicating that the deposit is complete. Referring to FIG. 5B, at step 508, customer mobile device 370 may receive the message indicating that the deposit is complete. At step 509, customer mobile device 370 may present the message indicating that the deposit is complete.

Alternatively, if the MICR line of the deposit item is not readable, then at step 510, item processing computing platform 310 may perform an image data lift on the image data of the deposit item (e.g., similar to how item processing computing platform 310 may perform an image data lift at step 410). At step 511, item processing computing platform 310 may identify a payor of the deposit item (e.g., similar to how item processing computing platform 310 may identify a payor of the deposit item at step 411). At step 512, item processing computing platform 310 may determine whether the deposit item is an on-us item (e.g., similar to how item processing computing platform 310 may determine whether the deposit item is an on-us item at step 412).

Figure 5C:
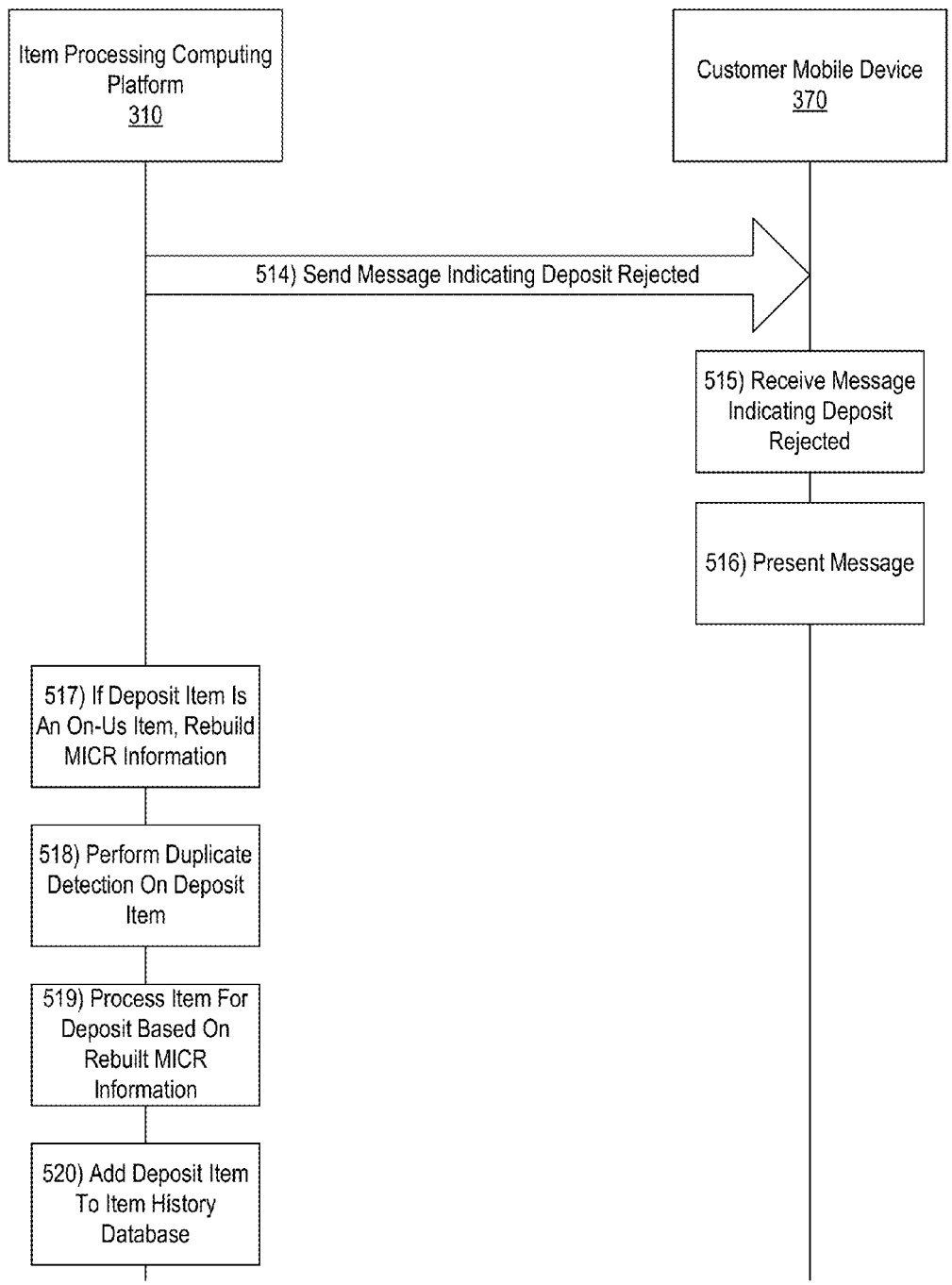
Figure 8:
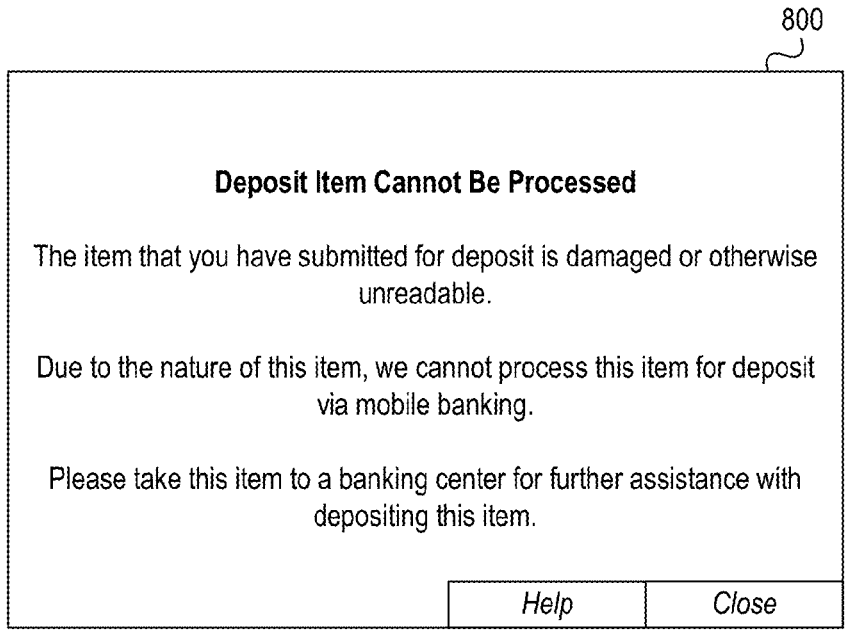

If the deposit item is not an on-us item, then at step 513, item processing computing platform 310 may reject the deposit item. Referring to FIG. 5C, at step 514, item processing computing platform 310 may send a message to customer mobile device 370 indicating that the deposit item has been rejected. At step 515, customer mobile device 370 may receive the message indicating that the deposit item has been rejected. At step 516, customer mobile device 370 may present the message indicating that the deposit item has been rejected. For example, in presenting the message indicating that the deposit item has been rejected, customer mobile device 370 may display, cause to be displayed, and/or otherwise present a graphical user interface similar to graphical user interface 800, which is illustrated in FIG. 8. As seen in FIG. 8, graphical user interface 800 may include text and/or other information notifying the user of customer mobile device 370 that the deposit item cannot be processed for deposit at customer mobile device 370 and/or requesting that the user of customer mobile device 370 visit a banking center for further assistance with depositing the deposit item.

Alternatively, if the deposit item is an on-us item, then, as illustrated in FIG. 5C, at step 517, item processing computing platform 310 may rebuild MICR information for the deposit item (e.g., similar to how item processing computing platform 310 may rebuild MICR information at step 417). At step 518, item processing computing platform 310 may perform duplicate detection on the deposit item (e.g., similar to how item processing computing platform 310 may perform duplicate detection at step 418). At step 519, item processing computing platform 310 may process the deposit item for deposit based on the rebuilt MICR information (e.g., similar to how item processing computing platform 310 may process the deposit item at step 419). At step 520, item processing computing platform 310 may add the deposit item to an item history database (e.g., similar to how item processing computing platform 310 may add the deposit item to the item history database at step 420).

Figure 5D:
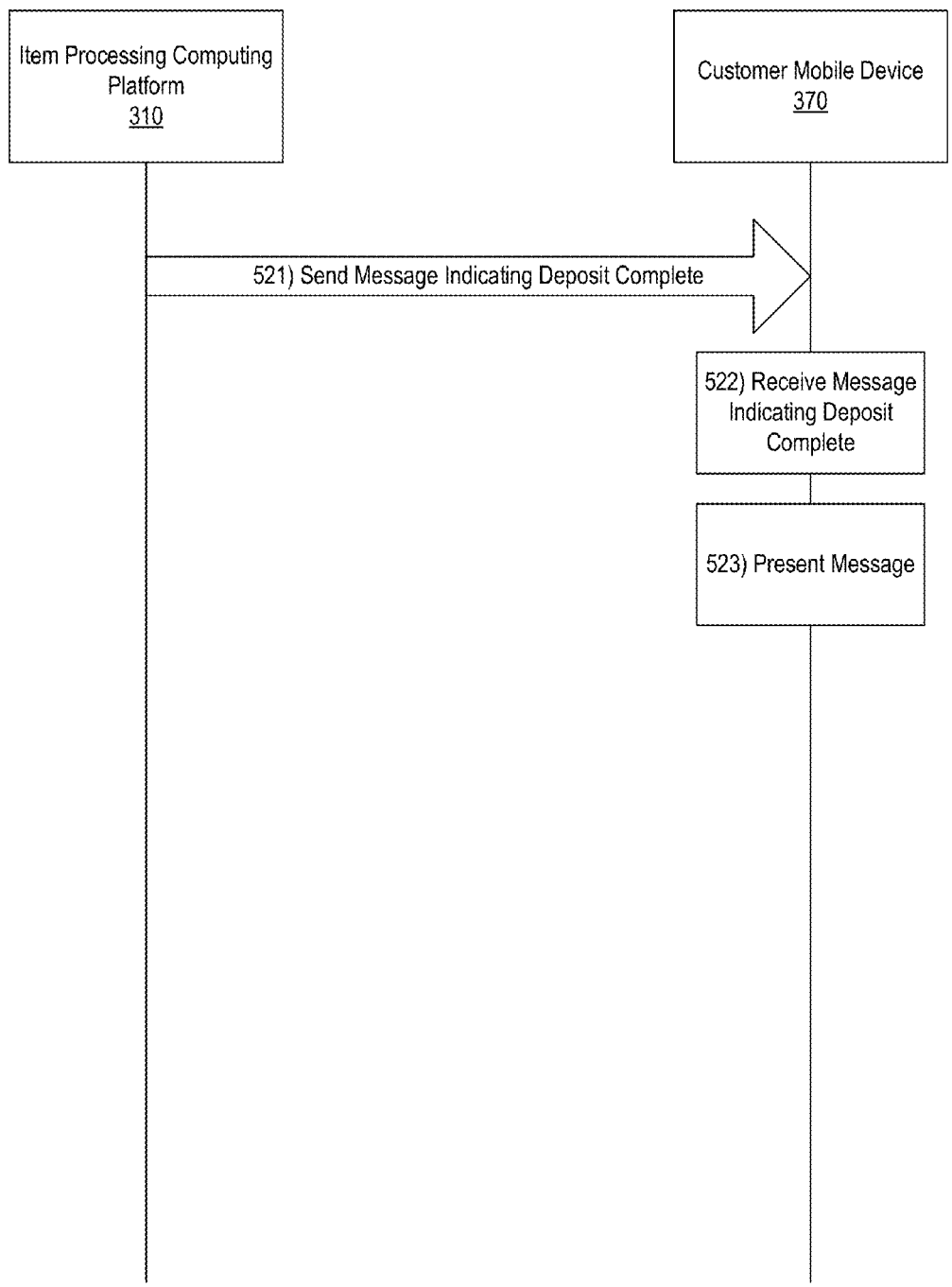
Figure 9:
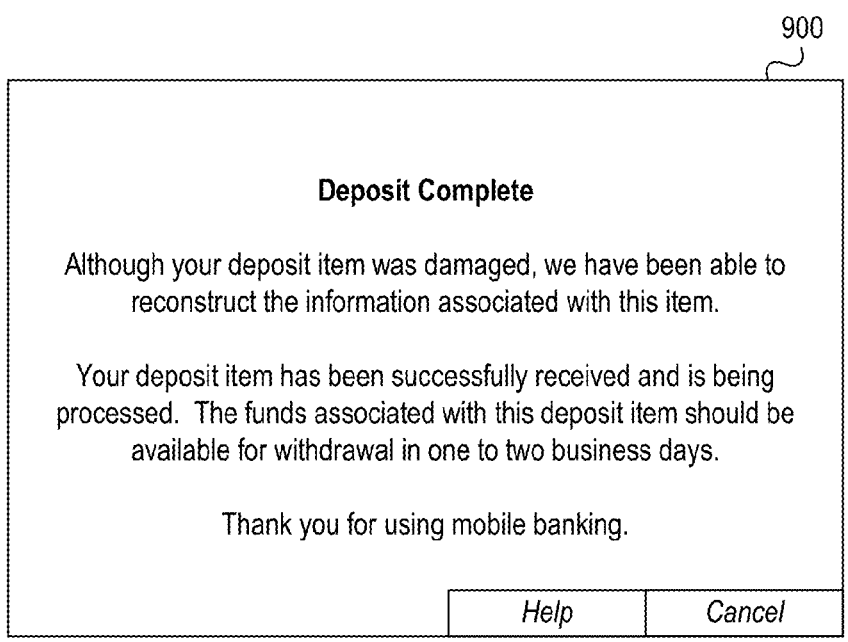

Referring to FIG. 5D, at step 521, item processing computing platform 310 may send a message to customer mobile device 370 indicating that the deposit is complete. At step 522, customer mobile device 370 may receive the message indicating that the deposit is complete. At step 523, customer mobile device 370 may present the message indicating that the deposit is complete. For example, in presenting the message indicating that the deposit is complete, customer mobile device 370 may display, cause to be displayed, and/or otherwise present a graphical user interface similar to graphical user interface 900, which is illustrated in FIG. 9. As seen in FIG. 9, graphical user interface 900 may include text and/or other information notifying the user of customer mobile device 370 that the deposit item was damaged but deposit information for the deposit item was rebuilt, that the deposit item has been received and is being processed, and/or that funds corresponding to the deposit item will be available in the deposit account at a particular time.

Figure 10:
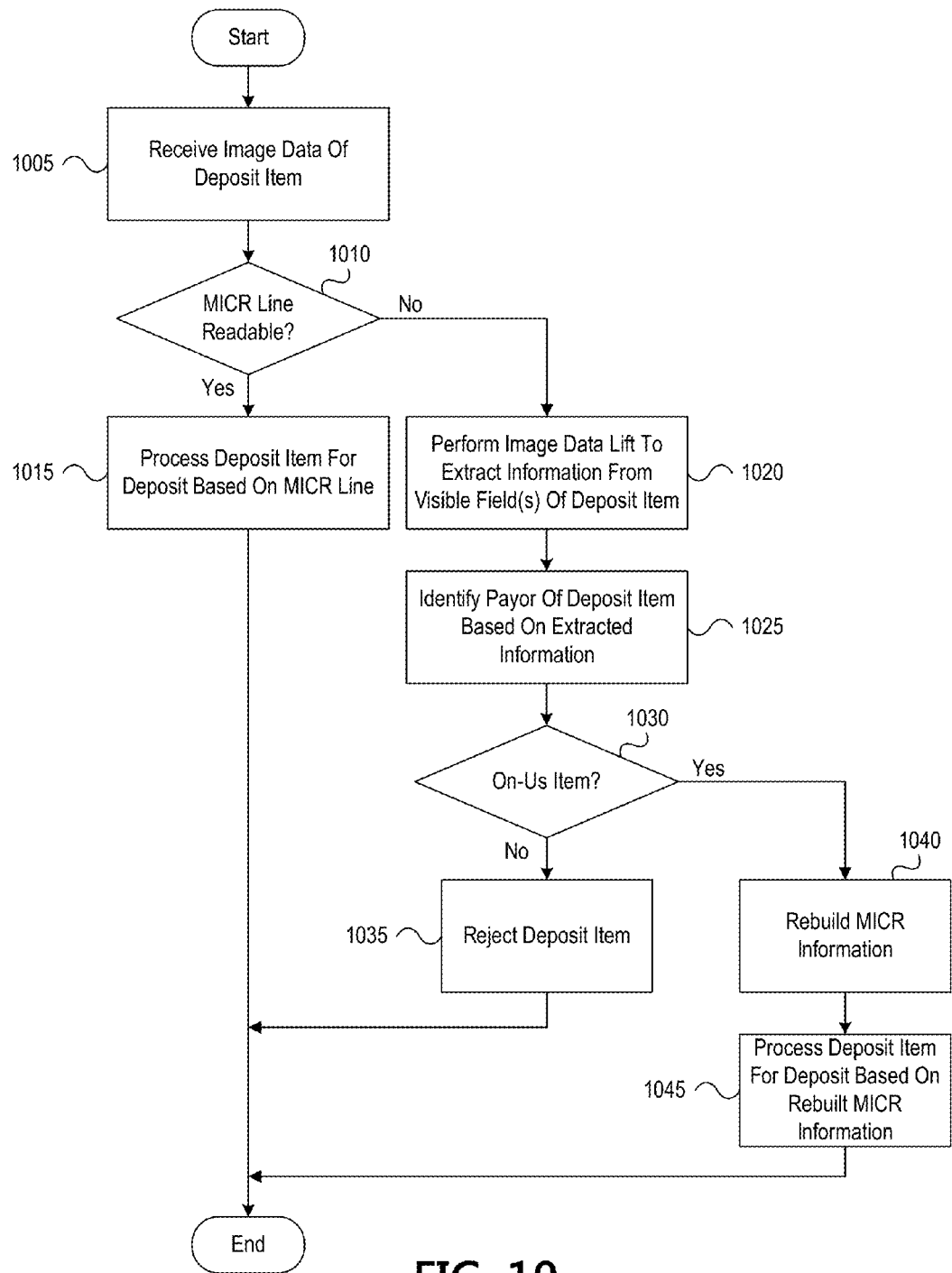
FIG. 10 depicts an illustrative method for processing damaged items using image data lift in accordance with one or more example embodiments.

FIG. 10 depicts an illustrative method for processing damaged items using image data lift in accordance with one or more example embodiments. Referring to FIG. 10, at step 1005, a computing platform may receive image data of a deposit item. At step 1010, the computing platform may determine whether a MICR line of the deposit item is readable. If the MICR line of the deposit item is readable, then at step 1015, the computing platform may process the deposit item for deposit based on the MICR line of the deposit item, and the method then may end.

Alternatively, if the MICR line of the deposit item is not readable, then at step 1020, the computing platform may perform an image data lift on the image data to extract information from one or more visible fields of the deposit item. At step 1025, the computing platform may identify the payor of the deposit item based on the extracted information. At step 1030, the computing platform may determine whether the deposit item is an on-us item based on the identified payor of the deposit item. If the deposit item is not an on-us item, then at step 1035, the computing platform may reject the deposit item, and the method then may end.

Alternatively, if the deposit item is an on-us item, then at step 1040, the computing platform may rebuild the MICR information for the deposit item. At step 1045, the computing platform may process the deposit item for deposit based on the rebuilt MICR information, and the method then may end.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system, comprising:
   at least one processor;
   a communication interface communicatively coupled to the at least one processor; and
   memory storing computer-readable instructions that, when executed by the at least one processor, cause the system to:
   receive, via the communication interface, and from a computing device, image data of a deposit item captured by the computing device;
   determine whether a magnetic ink character recognition (MICR) line of the deposit item is readable based on the image data of the deposit item captured by the computing device;
   if the MICR line of the deposit item is readable, process the deposit item for deposit based on the MICR line of the deposit item; and
   if the MICR line of the deposit item is not readable:
   perform an image data lift on the image data of the deposit item to extract information from one or more visible fields of the deposit item;
   identify a payor of the deposit item based on the information extracted from the one or more visible fields of the deposit item;
   determine, based on the payor of the deposit item, whether the deposit item is an on-us item, wherein the deposit item is an on-us item if the deposit item is drawn on a financial institution that operates the system;
   if the deposit item is not an on-us item, reject the deposit item; and
   if the deposit item is an on-us item:
   rebuild MICR information for the deposit item based on the payor of the deposit item identified based on the information extracted from the one or more visible fields of the deposit item; and
   process the deposit item for deposit based on the MICR information for the deposit item rebuilt based on the payor of the deposit item identified based on the information extracted from the one or more visible fields of the deposit item.

2. The system of claim 1, wherein the computing device is an automated teller machine (ATM) operated by the financial institution operating the system.

3. The system of claim 1, wherein the computing device is a mobile computing device comprising a mobile banking application configured to be used by a customer of the financial institution operating the system.

4. The system of claim 1, wherein the computing device is a teller terminal device configured to be used by a bank teller in a banking center of the financial institution operating the system.

5. The system of claim 1, wherein identifying the payor of the deposit item based on the information extracted from the one or more visible fields of the deposit item comprises identifying the payor of the deposit item based on one or more of payor name information or payor address information extracted from the one or more visible fields of the deposit item during the image data lift.

6. The system of claim 1, wherein rebuilding the MICR information for the deposit item based on the payor of the deposit item comprises:

identifying a routing number associated with a financial account of the payor of the deposit item;

identifying an account number associated with the financial account of the payor of the deposit item; and compiling the routing number associated with the financial account of the payor of the deposit item and the account number associated with the financial account of the payor of the deposit item to create the MICR information for the deposit item.

7. The system of claim 1, wherein the memory stores additional computer-readable instructions that, when executed by the at least one processor, further cause the system to:

perform duplicate detection on the deposit item based on item history information obtained from an item history database.

8. The system of claim 1, wherein the memory stores additional computer-readable instructions that, when executed by the at least one processor, further cause the system to:

add item history information to an item history database based on the MICR information for the deposit item rebuilt based on the payor of the deposit item identified based on the information extracted from the one or more visible fields of the deposit item.

9. The system of claim 1, wherein processing the deposit item for deposit based on the MICR information comprises applying one or more provisional credit rules to determine whether provisional credit is applied to a deposit account for the deposit item based on a number of visible fields from which information is extracted during the image data lift.

10. The system of claim 1, wherein the memory stores additional computer-readable instructions that, when executed by the at least one processor, further cause the system to:

after processing the deposit item for deposit based on the MICR information, cause a notification to be presented on the computing device indicating that the deposit item has been processed.

11. A method, comprising:

at a computing platform comprising at least one processor, memory, and a communication interface:

receiving, by the at least one processor, via the communication interface, and from a computing device, image data of a deposit item captured by the computing device;

determining, by the at least one processor, whether a magnetic ink character recognition (MICR) line of the deposit item is readable based on the image data of the deposit item captured by the computing device;

if the MICR line of the deposit item is readable, processing, by the at least one processor, the deposit item for deposit based on the MICR line of the deposit item; and if the MICR line of the deposit item is not readable:

performing, by the at least one processor, an image data lift on the image data of the deposit item to extract information from one or more visible fields of the deposit item;

identifying, by the at least one processor, a payor of the deposit item based on the information extracted from the one or more visible fields of the deposit item;

determining, by the at least one processor, based on the payor of the deposit item, whether the deposit item is an on-us item, wherein the deposit item is an on-us item if the deposit item is drawn on a financial institution that operates the computing platform;

if the deposit item is not an on-us item, rejecting, by the at least one processor, the deposit item; and if the deposit item is an on-us item:

rebuilding, by the at least one processor, MICR information for the deposit item based on the payor of the deposit item identified based on the information extracted from the one or more visible fields of the deposit item; and processing, by the at least one processor, the deposit item for deposit based on the MICR information for the deposit item rebuilt based on the payor of the deposit item identified based on the information extracted from the one or more visible fields of the deposit item.

12. The method of claim 11, wherein identifying the payor of the deposit item based on the information extracted from the one or more visible fields of the deposit item comprises identifying the payor of the deposit item based on one or more of payor name information or payor address information extracted from the one or more visible fields of the deposit item during the image data lift.

13. The method of claim 11, wherein rebuilding the MICR information for the deposit item based on the payor of the deposit item comprises:

identifying a routing number associated with a financial account of the payor of the deposit item;

identifying an account number associated with the financial account of the payor of the deposit item; and compiling the routing number associated with the financial account of the payor of the deposit item and the account number associated with the financial account of the payor of the deposit item to create the MICR information for the deposit item.

14. The method of claim 11, further comprising:

performing, by the at least one processor, duplicate detection on the deposit item based on item history information obtained from an item history database.

15. The method of claim 11, further comprising:

adding, by the at least one processor, item history information to an item history database based on the MICR information for the deposit item rebuilt based on the payor of the deposit item identified based on the information extracted from the one or more visible fields of the deposit item.

16. The method of claim 11, wherein processing the deposit item for deposit based on the MICR information comprises applying one or more provisional credit rules to determine whether provisional credit is applied to a deposit account for the deposit item based on a number of visible fields from which information is extracted during the image data lift.

17. The method of claim 11, further comprising:

after processing the deposit item for deposit based on the MICR information, causing, by the at least one processor, a notification to be presented on the computing device indicating that the deposit item has been processed.

18. One or more non-transitory computer-readable media storing instructions that, when executed by a computing platform comprising at least one processor, memory, and a communication interface, cause the computing platform to:

receive, via the communication interface, and from a computing device, image data of a deposit item captured by the computing device;

determine whether a magnetic ink character recognition (MICR) line of the deposit item is readable based on the image data of the deposit item captured by the computing device;

if the MICR line of the deposit item is readable, process the deposit item for deposit based on the MICR line of the deposit item; and if the MICR line of the deposit item is not readable:
perform an image data lift on the image data of the deposit item to extract information from one or more visible fields of the deposit item;

identify a payor of the deposit item based on the information extracted from the one or more visible fields of the deposit item;

determine, based on the payor of the deposit item, whether the deposit item is an on-us item, wherein the deposit item is an on-us item if the deposit item is drawn on a financial institution that operates the computing platform;

if the deposit item is not an on-us item, reject the deposit item; and if the deposit item is an on-us item:
rebuild MICR information for the deposit item based on the payor of the deposit item identified based on the information extracted from the one or more visible fields of the deposit item; and process the deposit item for deposit based on the MICR information for the deposit item rebuilt based on the payor of the deposit item identified based on the information extracted from the one or more visible fields of the deposit item.

* * * * *